United States Patent [19]

Gardner et al.

[11] E Patent Number: Re. 32,940

[45] Reissued Date of Patent: Jun. 6, 1989

[54] MEDICAL APPLIANCE

[75] Inventors: Arthur M. N. Gardner, Ipplepen; Roger H. Fox, Totnes, both of England

[73] Assignee: Electro-Biology, Inc., Parsippany, N.J.

[21] Appl. No.: 194,519

[22] Filed: May 16, 1988

Related U.S. Patent Documents

Reissue of:

[64] Patent No.: 6,141,792
Issued: Sep. 30, 1986
Appl. No.: 794,443
Filed: Nov. 4, 1985

U.S. Applications:

[60] Continuation of Ser. No. 763,686, Aug. 8, 1985, Pat. No. 4,614,180, which is a continuation-in-part of Ser. No. 621,499, Jun. 18, 1984, abandoned, and a continuation-in-part of Ser. No. 751,150, Jul. 2, 1985, abandoned, which is a division of Ser. No. 621,499, Jun. 18, 1984, abandoned.

[30] Foreign Application Priority Data

Jun. 22, 1983 [GB] United Kingdom ..... 8316959
Nov. 11, 1983 [GB] United Kingdom ..... 8330138

[51] Int. Cl.[4] ..... A61H 7/00

[52] U.S. Cl. ..... 128/64; 128/75 B; 128/40; 128/DIG. 20

[58] Field of Search ..... 128/64, 25 B, DIG. 20, 128/40

[56] References Cited

U.S. PATENT DOCUMENTS 2,880,721 4/1959 Corcoran ..... 128/64
3,171,410 3/1965 Towle, Jr. et al. ..... 128/DIG. 20
3,908,642 9/1975 Vinmont ..... 128/40

FOREIGN PATENT DOCUMENTS 2390156 1/1979 France ..... 128/24 R

OTHER PUBLICATIONS

"The Venous Pump of the Human Foot-Preliminary Report"; Bristol Medico-Chirugical Journal; Gardner and Fox; pp. 109-112; Jul. 1983.

*Primary Examiner*—Edgar S. Burr
*Assistant Examiner*—Tonya Lamb
*Attorney, Agent, or Firm*—Hopgood, Calimafde, Kalil, Blaustein & Judlowe

[57] ABSTRACT

The invention contemplates a non-invasive technique and apparatus for artificially stimulating the venous-return flow of blood from the foot by inducing sharply pulsed squeezing or necking-down of the vessels of the venous-pump mechanism within the foot. The sitmulation results from transient flattening of the plantar arch, in that an induced transient spread of the heel with respect to the ball of the foot stretches, and therefore necks-down involved blood vessels; stimulation also results from such a squeeze of the plantar-arch region as to concurrently squeeze the involved blood vessels. Cyclically inflatable devices, local to the foot-pump region, are disclosed for inducing either or both of the indicated actions.

16 Claims, 4 Drawing Sheets

MEDICAL APPLIANCE

Matter enclosed in heavy brackets [ ] appears in the original patent but forms no part of this reissue specification; matter printed in italics indicates the additions made by reissue.

RELATED CASES

This application is a continuation of a first copending application Ser. No. 763,686, filed Aug. 8, 1985, and said copending application is a continuation-in-part of our originally filed application Ser. No. 621,499, filed June 18, 1984; this application is also a continuation-in-part of a second copending application Ser. No. 751,150, filed July 2, 1985, now abandoned, and said second copending application is a division of said original application Ser. No. 621,499, filed June 18, 1984, *which claimed priority from United Kingdom application No. 8316959, filed June 22, 1983 and United Kingdom application 8330138, filed Nov. 11, 1983.*

BACKGROUND OF THE INVENTION

The invention relates to a medical appliance, and particularly to a medical appliance for applying pressure to a part of a human body for the purpose of stimulating blood circulation.

Such medical appliances are known which comprise a double-walled sheath adapted to fit over a limb, for example an arm or a lower leg portion, to be treated, and a pump apparatus arranged to inflate and deflate the sheath cyclically thereby to apply a pumping action to the limb and thus assist venous blood-flow therein.

A particular disadvantage of such known appliances is that they cannot be used when the limb to be treated is also to be encased in a plaster cast, or sometimes when the limb has been subjected to surgery; neither is it possible, with any appliance which completely encloses the extremity, for the physician to use the pin-prick test for nerve response at the involved extremity, nor can he carry out the essential tests to assess the state of circulation at the extremity.

A further disadvantage of known appliances is that they are not suited to continuous use by the patient.

These disadvantages are particularly significant in relation to appliances for use on feet and legs where as is known stimulation of blood flow is desirable when the limb cannot be used for walking.

We have discovered a venous pump mechanism in the sole of the human foot, which under normal walking conditions for the foot, serves to return blood from the leg into the abdomen with no assistance from muscular action.

BRIEF STATEMENT OF THE INVENTION

According to one aspect of this invention, there is provided a medical appliance comprising an active device for engagement, in use, with at least the sole of a human foot, said device being operative, in use of the appliance, to apply pressure cyclically to said sole thereby to stimulate the venous pump mechanism in said foot.

Essentially, said active device includes means to render said device active when said foot is not in use for ambulation.

According to another aspect of this invention there is provided a medical appliance comprising an active device in the form of an inflatable bag shaped for engagement with at least the sole of a human foot; inflation means connected to the bag and capable of inflating the bag rapidly; means to deflate the bag; and means to secure the bag to a human foot such that when being inflated the bag applies pumping pressure to the sole of the foot.

DETAILED DESCRIPTION

Several medical appliances embodying this invention will now be described by way of example with reference to the drawings, in which.

Figure 1:
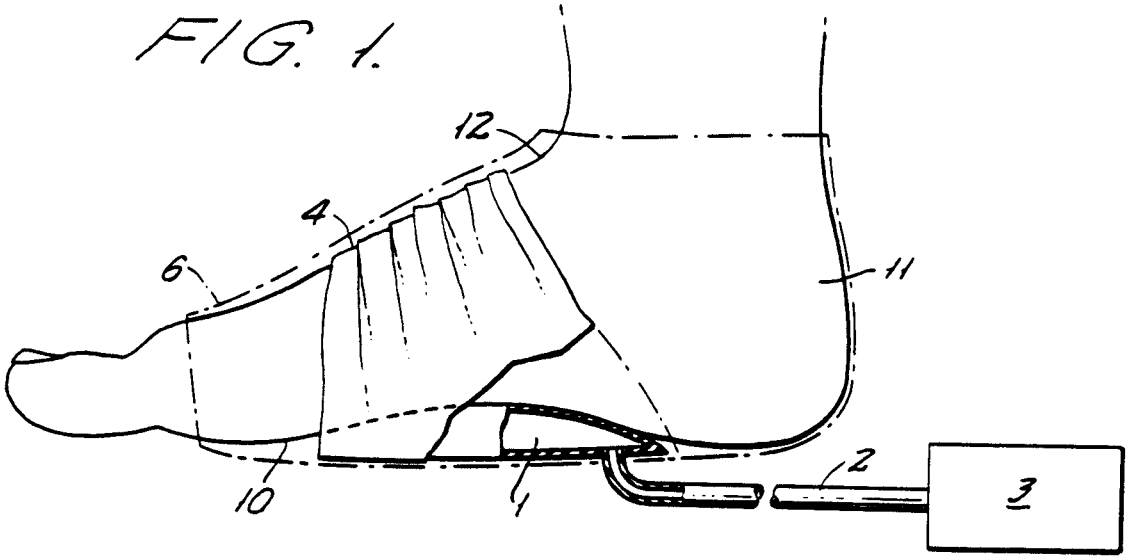
FIG. 1 is a view of a first appliance, partly broken away and in position on a human foot.

Referring to FIG. 1, the appliance here shown comprises an inflatable bag 1 formed of plastics material and shaped for engagement with the sole 10 of a human foot 11 in the plantar arch thereof. The bag 1 is connected by way of a flexible pipe 2 to a pump apparatus 3 by which the bag 1 can be inflated.

The bag 1 may be secured to the foot 11 by a suitable slipper or by adhesive means, but in the form shown a cloth sling 4 embraces the bag 1 and is secured over the instep 12 of the foot 11. Padding material can be located between the sling 4 and the instep 12 if necessary or desirable, and it is generally recommended that a porous knitted or other fabric such as stockinette be first applied to the foot so as to be interposed between the bag 1 and the foot, thus allowing for ventilation and preventing chafing of the skin.

The sling 4 and bag 1 are covered by a cloth slipper 6 which covers the majority of the foot 11.

In use of the appliance when secured to a foot as shown in FIG. 1, the pump apparatus 3 operates rapidly to inflate the bag 1 which when applies a pumping pressure to the sole 10 of the foot 11, and also urges the ball and heel of the foot away from each other, thus flattening the plantar arch as would occur if the foot 11 were placed on the ground during normal ambulation, thereby stimulating venous blood-flow. Preferably, an accumulator tank is part of the pump apparatus 3, the same being continuously charged by the pump, and having the capacity for rapid inflation of bag 1. A valve arrangement (not shown) in the pump apparatus 3 then allows the bag 1 to deflate, whereafter the bag 1 is again inflated, the inflation/deflation cycle being repeated as long as treatment with the appliance is required.

Preferably inflation of the bag 1 is effected in two seconds or less to provide a satisfactory pumping action, while deflation of the bag 1 can take as long as is necessary for the return of blood to the veins of the foot 11.

The treatment thus provided simulates walking on the foot 11, and thereby improves venous blood circulation in a person being treated who would normally be unable to walk or possibly even stand on the foot.

As a modification of the above described appliance, the valve arrangement in pump apparatus 3 can be dispensed with, the pump apparatus serving only for cyclic inflation of the bag 1, and at least the surface of the bag 1 in contact with the foot 11 being formed with air leakage orifices thereby to be permeable to air, or being made of a microporous material which is inherently permeable to air. Such a surface can be provided as will give the required period for deflation of the bag 1.

Such an appliance gives the advantages that the air leaving the permeable surface of the bag 1 serves to prevent accumulation of moisture between the bag 1 and the foot 11, thus enhancing the comfort of the user of the appliance and making skin problems less likely.

A particular advantage of the appliance of this invention is that it can be used when a foot is to be encased in a plaster cast, or when the leg carrying the foot 11 has been subjected to surgery.

Figure 2:
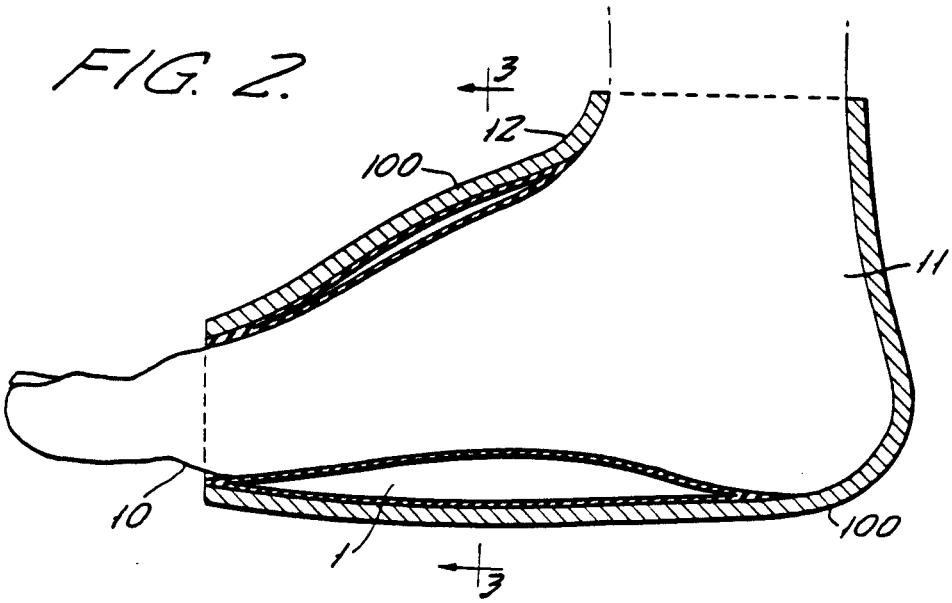
FIG. 2 is a view similar to FIG. 1, but showing a sectional view of a second appliance.
Figure 3:
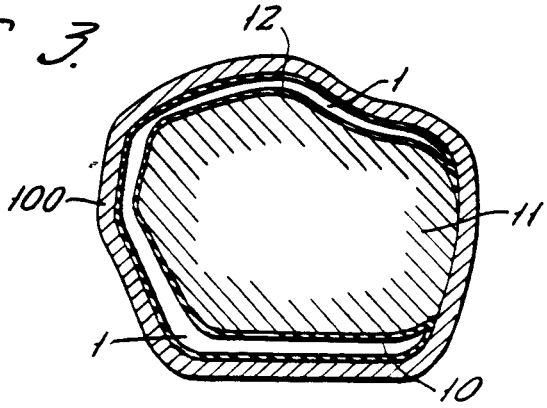
FIG. 3 is a sectional view on the line III—III in FIG. 2.

FIGS. 2 and 3 of the drawings show an appliance in position for use on a human foot 11 under a plaster cast 100, the same reference numerals as used in FIG. 1 being used for corresponding parts.

The appliance shown in FIGS. 2 and 3 is similar to that shown in FIG. 1, but is larger and extends not only under the sole 10 of the foot 11, but also around the inside of the foot 11 and over the instep 12 of the foot 11.

For use, the appliance is positioned on the foot 11 and the plaster cast 100 is then formed over the bag 1 as required, with the pipe 2 from the pump apparatus 3 passing either through a hole in the cast 100 or out of one end of the cast 100.

The bag 1 can be maintained in a partially inflated condition while the plaster cast 100 is formed, whereby allowance for subsequent possible swelling of the foot 11 is made.

Figure 4:
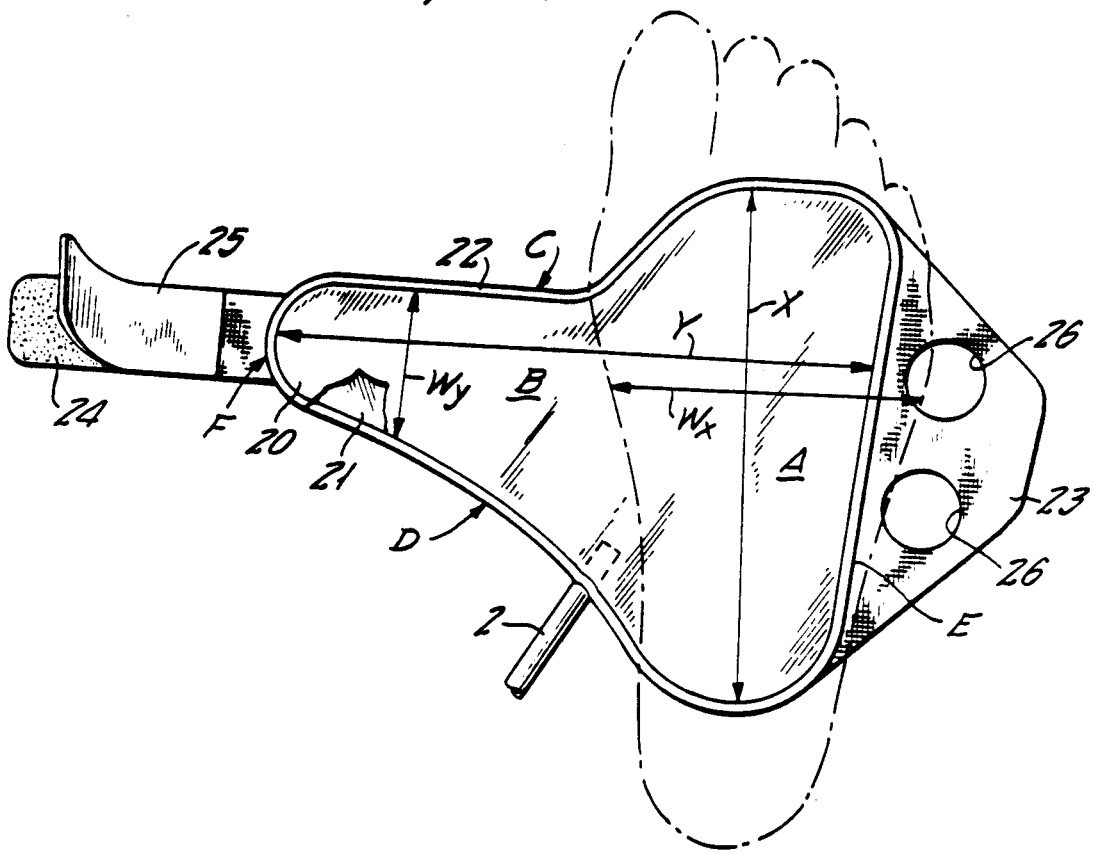
FIG. 4 is a partly broken-away plan view of the bag 1 as an article of manufacture, with a phantom superposed plan view of a right foot, positioned for wrapped application of the bag thereto.

More specifically, and referring to FIG. 4, the inflatable bag 1 may comprise two like panels 20-21 of flexible material, such as PVC or polyurethane film, peripherally sealed to each other as indicated at an edge seam 22. Each of the panels comprises a plantar-aspect sole area A configurated to longitudinally lap essentially only the region of the foot between adjacent plantar limits of the ball and heel of the foot and to extend into substantial register with lateral limits of the sole of the foot. The panels 20-21 also include, within the same peripheral seal or seam 22, an integrally formed dorsimedial area B which extends transversely from one edge of the sole area A to a transverse extent which is substantially as great as the longitudinal extend of the area A. Typically, as shown, for a foot requiring a shoe in the size range 9 to 12, the longitudinal extent X of the bag is about 7 inches, and the maximum transverse extent Y of the bag is about 8 inches. The average width $W_X$ of the sole area A is about 2.75 inches, and the reduced width $W_Y$ of the area B is about 2 inches. Along its anterior edge C, the area B is substantially straight and transverse to the longitudinal direction of area A, and along its posterior edge D, the area B tapers in a concave sweep from the heel end of area A to the narrow transverse end at width $W_Y$, the inlet pipe 2 having sealed entry approximately midway along the edge D.

What has been described for bag 1 in connection with FIG. 4 will in and of itself serve well as an article of manufacture, in the gauze, muslin, bandage material and/or adhesive tape may be relied upon to retain a circumferentially wrapped application of the bag to the foot. However, to facilitate such application without initial resort to such other instrumentalities, FIG. 4 additionally illustrates present preference for a flexible anchor tab 23 (as of vinyl sheet) which is integrally formed with bag 1, extending laterally beyond seam 22 at the longitudinal edge E of area A, and for a tie-down tab 24, also integrally formed with bag 1 beyond seam 22 at the transverse tip F of area B. A peel-off strip 25 of suitable release material is shown protecting a coating of pressure-sensitive adhesive on tab 24, so that upon adhesive exposure, tab 24 may be "tacked" to tab 23 in adjustably secured retention of the wrapped application of bag 1 to a foot. And it will be noted for the preferred relatively non-stretch nature of the material of tabs 23-24, a "tacked" circumferential completion of the wrap, involving a fastening of tab 24 in outer-end lap with tap 23, will enable circumferential hoop-tension force to be relatively uniformly distributed along substantially the entire longitudinal extent of area A, i.e., along edge E, thus assisting in the plantar-arch flattening action described above. Plural apertures in the larger tab 23 allow ventilation of adjacent skin but do not impair the indicated distribution of hoop-tension force.

Although FIG. 4 happens to show bag 1 for the situation in which the right foot is accommodated, it will be understood that the same accommodation to the left foot may also be made by the same article of manufacture. In application to the left foot, the plan view of FIG. 4 is reversed, from left to right, by placing the panel 20 on the bottom, beneath panel 21, and the pressure-sensitive adhesive is just as "tackable" to tab 23 as before, except for being engaged beneath tab 23.

As has already been noted, the release of pressure fluid after each pulsed delivery of inflation pressure is suitably via pores or apertures in one or both of panels 20-21. It may be found convenient to manufacture the bag 1 without such pores or apertures, using puncturable material. And the surgeon who makes the fitted application to a patient's foot need only first blow the bag via his mouth, then hold inlet 2 closed with a finger, while he uses a needle or other sharply pointed instrument to make plural punctures of the panel (20 or 21) which is to be adjacent the sole of the patient's foot; such puncturing may proceed while the surgeon squeezes the bag to satisfy himself that the desired degree of fluid leakage will be achieved in use. On the other hand, we prefer that bags 1 be marketed with existing perforations in each of two configurations, one specifically committed to right-foot application and the other specifically committed to left-foot application.

The described bag 1 of FIG. 4 will be seen, in cyclically pressurized use within the circumferential bandage or sling 4 of FIG. 1, or within the cast 100 of FIGS. 2 and 3, to provide a peripherally continuous confinement of the midtarsal and plantar regions of a foot, with the action of rapidly shrinking the confinement in a cylindrical pattern of relatively rapid short-duration release from shrink action. More specifically, this confinement and cyclical action may be viewed as the means of providing (a) upward and spreading force at longitudinally spaced plantar regions of the sole of the foot, said regions being essentially limited by and between the ball and heel of the foot and (b) downward force at the region of the midtarsal joint. As a result of the indicated cyclical pattern, the arch is caused to flatten periodically and thus to stretch and neck down the internal sectional area of the veins of the lateral plantar complex, with resulting venous-pump action. Viewed in a still further light, this confinement and cyclical action will be seen as the means of providing vertically opposed squeezing forces between the plantar region of the sole of the foot and the region of the midtarsal joint, to thereby stimulate the venous-pump mechanism of the foot.

In all cases, it is important and deemed significant that neither the distal calf pump nor the proximal calf pump, nor any other of the significant pumps of the venous-return system of the involved leg is actuated in time-coincidence with foot-pump actuation. This fact illustratively enables the described invention to be operative within a cast, or to be operative in a region remote from orthopedic fixation of a damaged tibia, knee, or femur, or to be similarly remote from the region of a vein-transplant operation and thus to relatively rapidly dissipate the pain and swelling which are the normally expected post-operative consequence of such an operation. In spite of the remoteness of foot-pump actuation from these other regions of trauma, the fact of no other pump involvements means that foot-pump driven venous return flow can be substantially unimpeded in its direct delivery to and through the region of trauma.

Figure 5:
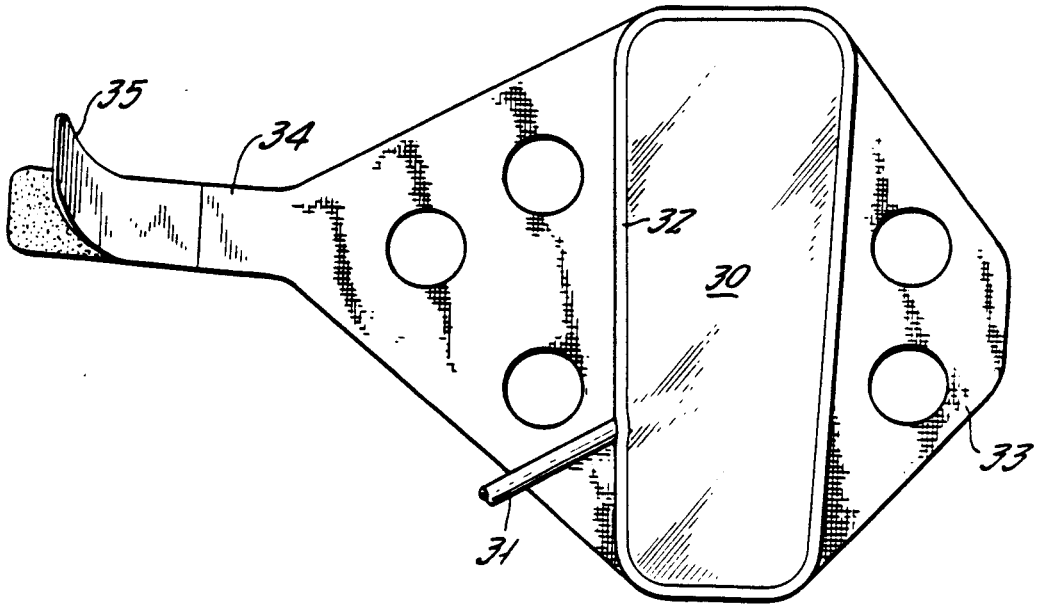
FIGS. 5 and 6 are views similar to FIG. 4, to show modifications.
Figure 6:
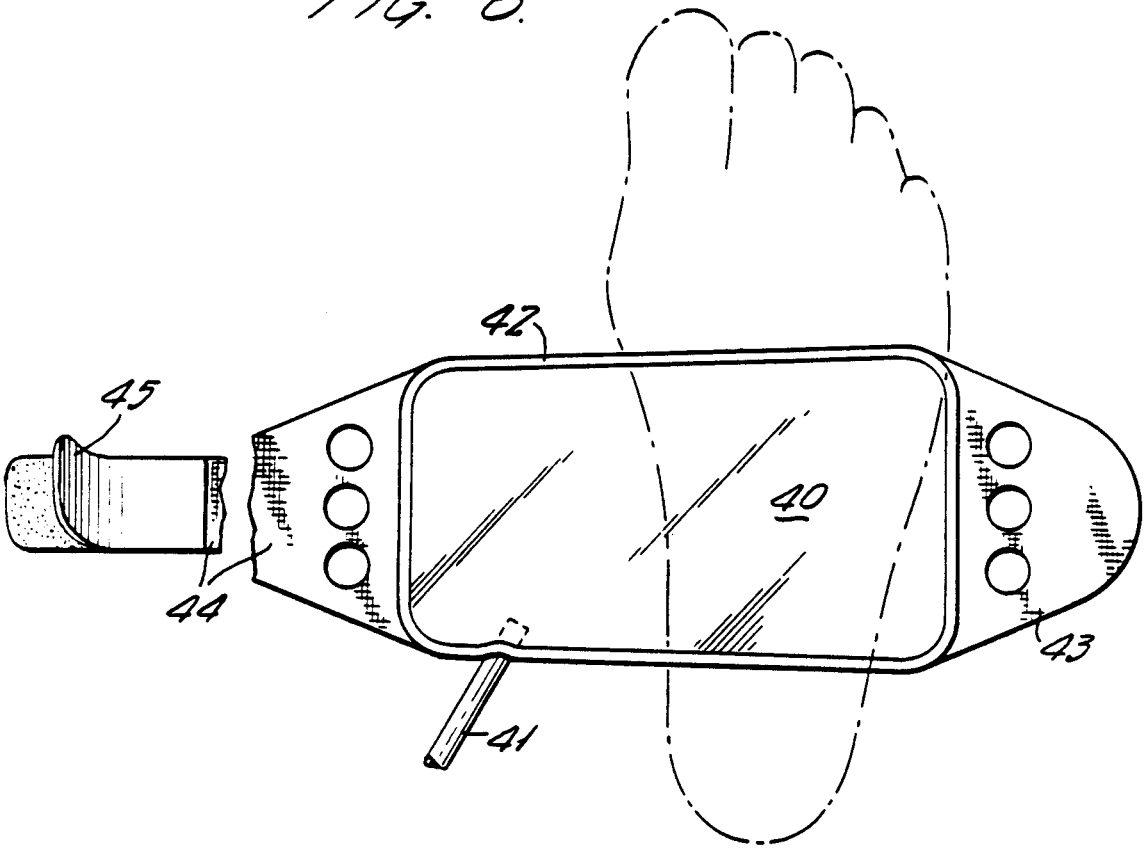

FIGS. 5 and 6 are further inflatable-bag embodiments of the invention, although they are presently of lesser preference, as compared to the embodiment of FIG. 4.

In FIG. 5, an inflatable bag 30 is longitudinally elongate and corresponds generally to the function and placement of area A of the bag 1 in FIG. 4. Bag 30 thus is designed for application to the plantar region of the sole of the foot, being cyclically inflatable via a flexible inlet pipe 31 sealed to bag 30 via locally sealed access through the peripheral seam 32 of the bag. A perforated flexible tab 33 corresponds to the tab 23 of FIG. 4, and a similar but ultimately more narrow and more extensive tab 34 is connected to the opposite longitudinal edge of bag 30, being adhesively coated and protected by peel-off material 35. A retaining hoop is circumferentially completed by pressure adhesion of tab 34 to tab 33. In a cyclical application of pressure fluid to the device of FIG. 5, it is the longitudinal flattening of the arch which is primarily responsible for foot-pump stimulation.

In the arrangement of FIG. 6, an inflatable bag 40, served by an inlet pipe 41 and peripherally sealed at seam 42 is generally rectangular but elongate in the direction transverse to the longitudinal direction of the foot (phantom outline); and end tabs 43-44 correspond to those previously described, to enable pressure-adhered completion of a circumferential hoop or belt around the midtarsal/plantar regions of the foot. In a cyclical application of pressure fluid to the device of FIG. 6, it is the generally vertical squeezing action at the midtarsal/plantar region which is primarily responsible for foot-pump stimulation, i.e., virtually without any arch-flattening action.

In certain post-operative situations wherein a part of the leg other than the foot is involved, it is therapeutically beneficial not only to operate the foot pump but also to allow the patient a degree of freedom to stand and walk on his installed foot-pump bag 1, or 30, or 40. In such a situation, a fitted slipper 50 is most useful, and may take any one of a variety of forms, so that FIGS. 7 and 8 will be understood to be merely illustrative of one of these forms.

Figure 7:
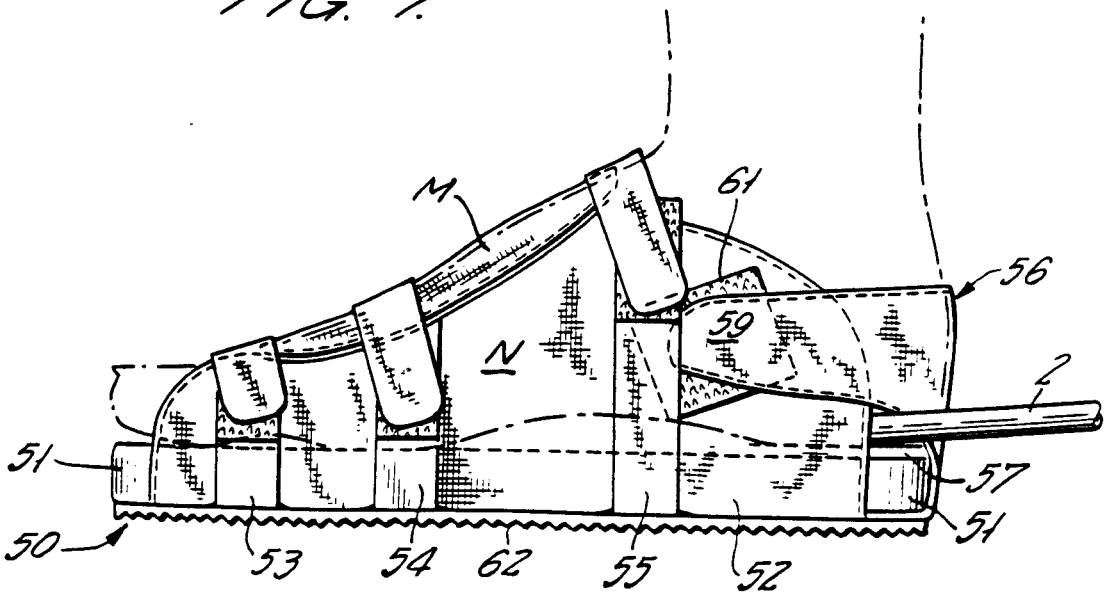
FIG. 7 is a side view in elevation of a slipper applied over a foot that has been fitted with one of the inflatable foot-pump bags of the invention.
Figure 8:
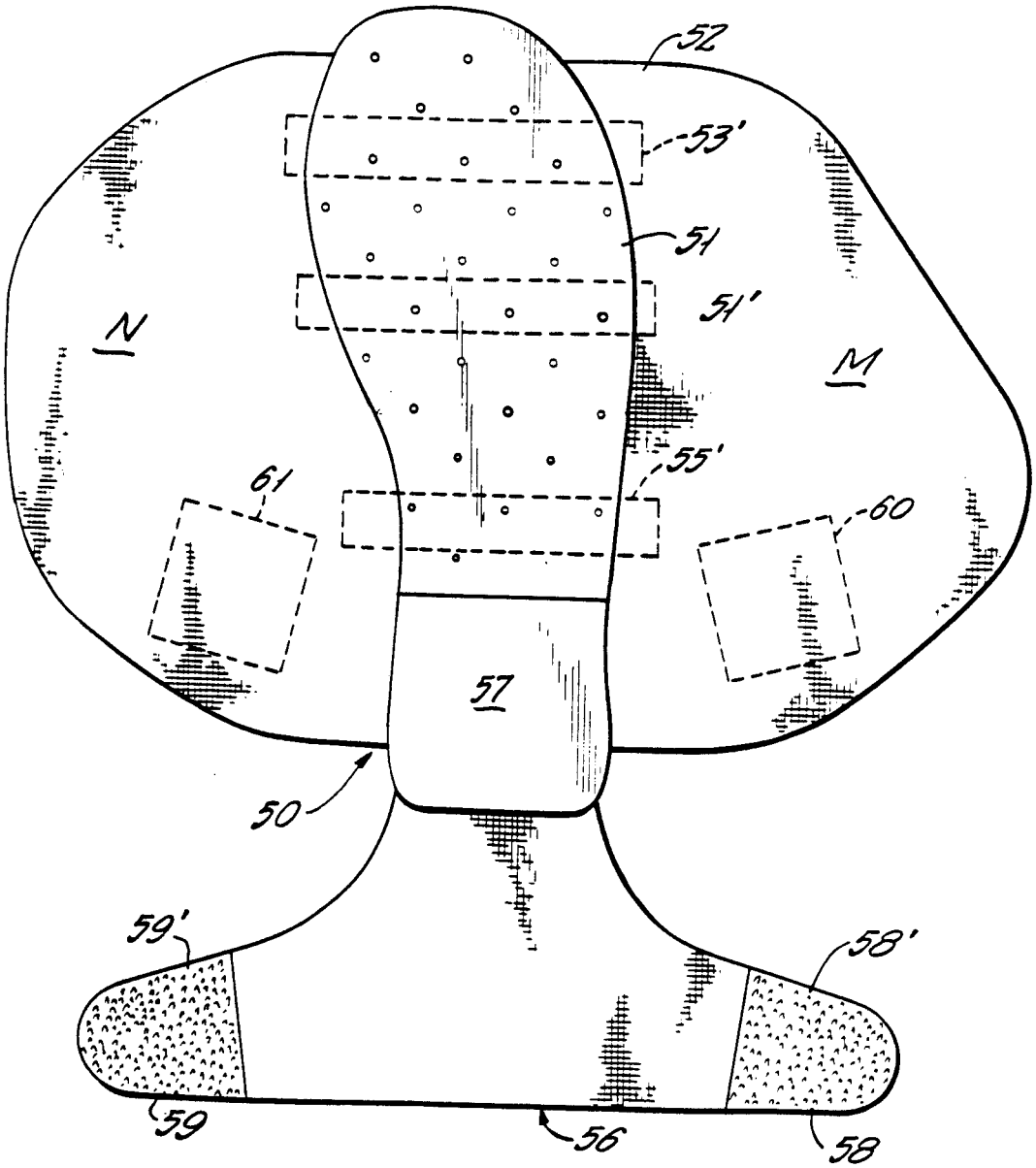
FIG. 8 is a plan view of the slipper of FIG. 7, in flattened condition, prior to use.

The slipper 50 comprises a sole member 51 of relatively rigid, porous, light-weight material, centrally adhered to a sheet 52 of light-weight duck or canvas, leaving flexible lateral flaps M-N projecting laterally beyond the respective longitudinal side edges of sole member 51; flaps M-N are adapted for wrap-around fit to the particular foot, the lap of flap M over flap N being visible in FIG. 7. Woven-fabric straps 53-54-55-56 have centrally-sewn connection to the underside of sheet 52, at regions marked 53'-54'-55'-56' in FIG. 8, leaving free ends for completion of circumferential fastening of sole member 52 to the foot at each of three longitudinally spaced locations; it is convenient to have one end of each strap fitted with a wire bail, so that the other end of each strap can be threaded through the corresponding bail and be Velcro-fastened against itself, to hold each adjusted strap connection.

A tail portion 52' of fabric sheet 52 extends rearward of a small yieldable heel step 57 at the back end of sole member 51, and tail portion 56 is characterized by like, oppositely directed tabs 58-59, each of which has an exposed patch of Velcro loop material 58'-59'. These patches are selectively engageable with patches 60-61 of Velcro hook material sewn to the underside of panels M-N, as viewed in the sense of FIG. 8. A thin panel 62 of anti-skid material is bonded to the underside of the described assembly, to complete the slipper.

In use, and after installation of an inflatable-bag (1,30, 40) with its inlet pipe illustratively projecting upward and rearward from the inner lateral side of the ankle, the flaps M-N are first folded into overlap over the midtarsal region, and the straps 53-54-55 set to hold the overlap. Then, tail 56 is folded upward and each of the tabs 58-59 is wrapped around the back of the heel, into completion of Velcro engagements, at 58'-60 and at 59'-61, respectively. The slipper and foot-pump actuator are now in readiness to accept cyclical pressure-fluid stimulation via connection to inlet 2. It will be understood that the relatively rigid sole member 51 provides an excellent reference against which to react, upon bag inflation, for application of arch-flattening and/or midtarsal/plantar squeezing action of the nature discussed above.

As a modification of the appliances thus far shown and described, it will be understood that inflatable foot-pump bag 1 can be incorporated in an article of footwear, such as a conventional boot, to be worn by a person needing to use the appliance.

Figure 9:
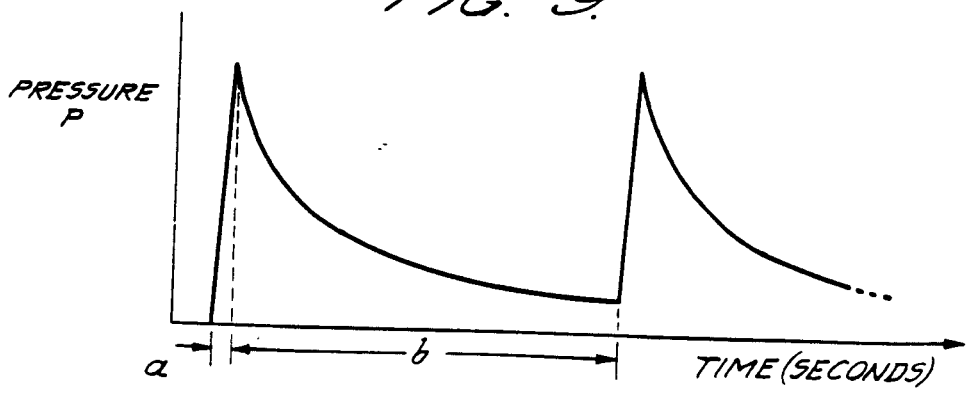
FIG. 9 is a simple graph of pressure as a function of time, in aid of discussion of use of the invention.

An inflatable bag 1 of the nature described in connection with FIG. 4 never requires a large volume change in proceeding through its inflation/deflation cycle. The maximum inflated volume is in the order of 300 to 350 cc, and on deflation the inflated volume can be expected to reduce to 100 to 120 cc. Thus, the pressure-fluid supply equipment 3 may be relatively small and convenient for table-top or shelf mounting, with flexible-hose and disconnectable coupling to the inlet pipe 2; this is true, whether the supply and control means 3 is merely timed valving to assure programmed delivery of pressure pulses of a fluid, such as oxygen from a locally available tank supply, or the means 3 incorporates its own pumping and/or accumulator mechanism to provide the needed pressure fluid. Whatever the alternative, standard regulator, bleed orifices, time delay devices and their adjustability are all well known and therefore the supply means 3 may take on a variety of different physical embodiments. What is important, however, is that delivery of pressure fluid to inlet 2 and the bleed of fluid through pores and/or apertures and/or valving in the deflation phase shall meet certain criteria. Presently preferred criteria will be stated in the context of FIG. 9, which shows pressure P to develop quickly in the inflation phase a and to dissipate somewhat exponentially, in the deflation phase b.

Although it has been stated above that bag 1 should be inflated in two seconds or less, it is perhaps more accurate to state that in our experience to date the inflation should be as quick as possible, to imitate the normal impact of the sole of the foot on the ground when walking. Such fast inflation imparts a jerk or sharply pulsed action in return blood flow, and such action is likely to be helpful in preventing venous thrombosis. It is believed that maximum velocity, however transient upon pulsed excitation, is more important than total blood flow. The veins have check-valve formations, and the downstream side of each check valve is a site where stagnation and clotting may occur; it is believed that with bag inflation as rapid as possible, the opening phase for each check valve is correspondingly rapid, thus locally stirring stagnant return-flow blood and reducing the chances of a clotting constriction of return-flow passages.

The peak pressure P for any delivered inflation impulse should be that which is sufficient to produce the appropriate venous impulse, whilst not being too uncomfortable for the patient to tolerate. This will of course mean a different peak pressure P which will be various, depending upon the particular patient and his affliction. However, it can be said that, in our experience to date, a peak pressure within bag 1 (20, 30, or 40) of 200 to 220-mm Hg has been satisfactory, although there may be times when it is advisable to use a peak pressure somewhat greater than 220-mm Hg. Such peak pressure has produced comfortable actuation of the patient's foot pump, in the circumstance wherein the supply apparatus 3 has provided time-switched delivery of oxygen from a pressurized tank and wherein the inflation time a was 0.4 second.

The total period (a+b) of the inflation/deflation cycle will also be various, depending upon the confronting pathological condition and, in particular, on the severity of venous obstruction and on how quickly the physiological venous pump becomes filled. As a rough guide, it can be said that in severe venous obstruction, as in a limb with marked swelling, the period of the cycle might be as frequent as every 10 seconds. In moderate swelling, 30 seconds would probably be adequate, whereas for maintenance purposes a 60-second cycle should suffice. The optimum frequency of the cycle can be audibly determined by the clinician, listening to the flow in the posterior tibial veins with a Doppler monitor.

Although the interval between inflation pulses is very much greater than the indicated rapid inflation time a, deflation should commence automatically at achievement of predetermined peak pressure, and initial deflation should be rapid and follow an exponential pattern. Thus, we currently recommend leakage in bag 1 to the extent that, for example, for a peak pressure P of 210-mm Hg, deflation to 30-mm Hg should be in about one second, and to 20-mm Hg in about 1.9 seconds. A timer, within apparatus 3, reinitiates the cycle upon predetermined time-out of the interval b.

Operations in which the described foot-pump actuating means are likely to be particularly useful include leg fractures and operations around the knee joint, where the leg veins may become compressed either during or after an operation. It has been found very useful in arterial and vein-graft operations, where some of the leg veins have had to be ligated and where the collateral venous-return channel (the long saphenous vein) has had to be removed for use as an arterial graft.

It will be seen that the described uses of the invention involve a method of promoting venous pump action in the leg of a living body and that, from one aspect, steps of the method comprise (a) application of a circumferential tie to the foot at the region of the midtarsal joint, (b) applying upward and spreading force between the circumferential tie and the foot at longitudinally spaced plantar regions of the sole of the foot, said plantar regions being essentially limited by and between the ball and heel of the foot, (c) relaxing said force for a period of time, and (d) cyclically repeating the force-application and force-relaxing steps in a pattern wherein force application is relatively rapid, whereby the arch of the foot is periodically caused to flatten and thus to stretch the neck down the internal sectional area of veins of the lateral plantar complex, with resulting venous-pump action.

From another aspect, steps (a) and (b) of the above method are modified to the extent that the upward and spreading force is in reaction to downward force at the region of the midtarsal joint, i.e., vertically opposed squeezing forces between the region of the midtarsal joint and the plantar region therebeneath. From a still further aspect, steps (a) and (b) may be viewed as establishing a peripherally continuous confinement of the midtarsal and vertically opposed plantar regions of the foot, and developing the squeezing forces through a periodic shrinking of the confinement.

What is claimed is:

1. The method of promoting venous pump action in the leg of a living body, which method comprises simultaneously applying (a) upward and spreading force at longitudinally spaced plantar regions of the sole of the foot, said regions being essentially limited by and between the ball and heel of the foot and (b) downward force at the region of the midtarsal joint, said forces being applied in a cyclical pattern of relatively rapid increase to a predetermined upper limit before relaxation for a period substantially exceeding the application time, whereby the arch of the foot is caused to flatten periodically and thus to stretch and neck down the internal local sectional area of the veins of the lateral plantar complex, with resulting venous-pump action.

2. The method of promoting venous pump action in the leg of a living body, which method comprises simultaneously applying vertically opposed squeezing forces between the plantar region of the sole of the foot and the region of the midtarsal joint, said forces being applied in a cyclical pattern of relatively rapid increase to a predetermined upper limit before relaxation for a period substantially exceeding the application time, thereby to stimulate the venous pump mechanism of the foot.

3. The method of promoting venous pump action in the leg of a living body, which method comprises establishing a peripherally continuous confinement of the midtarsal and plantar regions of a foot, and shrinking the confinement in a cyclical pattern of relatively rapid short-duration shrink action followed by a relatively long-duration release from shrink action.

4. The method of promoting venous pump action in the leg of a human body, which method comprises the steps of (a) applying a circumferential tie to the foot at the region of the midtarsal joint, (b) applying upward and spreading force between the circumferential tie and the foot at longitudinally spaced plantar regions of the sole of the foot, said plantar regions being essentially limited by and between the ball and heel of the foot, (c) relaxing said force for a period of time, and (d) cyclically repeating the force-application and the force-relaxation steps in a pattern wherein force-application is relatively rapid, whereby the arch of the foot is periodically caused to flatten and thus to stretch and neck down the internal sectional area of veins of the plantar complex, with resulting venous-pump action.

5. The method of claim 4, in which the circumferential tie is established by wrapped application of a cloth sling.

6. The method of claim 4, in which the circumferential tie is established by application of an orthopedic cast.

7. The method of claim 4, in which the circumferential tie is short of enveloping the toes of the foot.

8. The method of claim 4, in which the force application is developed in two seconds or less.

9. The method of claim 4, in which the circumferential tie is established by securing a slipper to the foot.

10. The method of claim 4, in which said force is pneumatically applied.

11. The method of promoting venous pump action in the leg of a living body, which method comprises the steps of (a) applying vertically opposed squeezing forces to the foot at the region of the midtarsal joint and at the plantar region therebeneath, (b) relaxing said forces for a period of time, and (c) cyclically repeating the force-application and the force-relaxation steps in a pattern wherein force-application is relatively rapid, whereby the veins of the plantar complex are periodically compressed, with resulting venous-pump action.

12. The method of promoting venous pump action in the leg of a human body, which method comprises the steps of (a) establishing a peripherally continuous plantar confinement of the foot at the region of the midtarsal joint, (b) shrinking the confinement, (c) relaxing the shrinking confinement, and (c) cyclically repeating the shrinkage and relaxing steps in a pattern wherein the shrinkage step is relatively rapid, whereby the veins of the plantar complex are periodically compressed, with resulting venous-pump action.

13. The method of promoting venous pump action in the leg of a human body, which comprises the steps of (a) selecting a relatively stiff sole member of length to overly the ball and heel of the foot and to span the plantar arch, (b) securing the same to the foot with referencing support at the ball and heel, (c) applying upward force between the sole member and the plantar arch, (d) relaxing said force for a period of time, and (e) cyclically repeating the force-application and the force-relaxation steps in a pattern wherein force-application is relatively rapid, whereby the internal sectional area of the veins of the plantar complex is periodically reduced, with resulting venous pump action.

14. The method of claim 5 or claim 11 or claim 12 or claim 13, in which the force application is developed in one second or less.

15. The method of claim 5 or claim 11 or claim 12 or claim 13, in which the period of force-relaxation is in the range of 10 to 60 seconds.

16. The method of claim 5 or claim 11 or claim 12 or claim 13, in which the force-application step is pneumatic and to a peak pressure of at least 200-mm Hg.

* * * * *

UNITED STATES PATENT AND TRADEMARK OFFICE

CERTIFICATE OF CORRECTION

PATENT NO. : Re. 32,940

DATED : June 6, 1989

INVENTOR(S) : Arthur M. N. Gardner and Roger H. Fox

It is certified that error appears in the above-identified patent and that said Letters Patent is hereby corrected as shown below:

On the title page under Related U.S. Patent Documents item [64] should read --Patent No.: 4,614,179--.

Signed and Sealed this

Seventeenth Day of March, 1992

*Attest:*

HARRY F. MANBECK, JR.

*Attesting Officer*

*Commissioner of Patents and Trademarks*

UNITED STATES PATENT AND TRADEMARK OFFICE

CERTIFICATE OF CORRECTION

PATENT NO. : Re. 32,940 Page 1 of 2

DATED : December 3, 1996

INVENTOR(S) : Gardner, et al.

It is certified that error appears in the above-indentified patent and that said Letters Patent is hereby corrected as shown below:

On the title page:

Beneath the heading "OTHER PUBLICATIONS", cancel the present 4-paragraph recital and replace with a 3-paragraph recital, as follows:

Gaskell and Parrott, "The Effect of a Mechanical Venous Pump on the Circulation of the Feet in the Presence of Arterial Obstruction", Pub. Apr. 1978, Surgery, Gynecology & Obstetrics.

Selahaddin Rastgeldi article in two parts: "I. Pressure Treatment of Peripheral Vascular Diseases, A Short Historical Review" and "II. Intermittent Pressure Treatment of Peripheral Vascular Diseases, A Survey of Sixteen Years Personal Experience", published in OPUSCULA MEDICA, Supplemental XXVII 1972, Grundad av Sixten Kallner 1956.

Gardner and Fox article, entitled "The Venous Pump of the Human Foot-Preliminary Report", published in the Jul. 1983 issue of BRISTOL MEDICO-CHIRURGICAL JOURNAL, at pp. 109-112.

In the ABSTRACT
at line 5, change "sitmulation"
to read --stimulation--.

Column 2, line 10, change "viewed" to read --Viewed--.

UNITED STATES PATENT AND TRADEMARK OFFICE

CERTIFICATE OF CORRECTION

PATENT NO. : Re. 32,940

DATED : December 3, 1996

INVENTOR(S) : Gardner, et al.

It is certified that error appears in the above-indentified patent and that said Letters Patent is hereby corrected as shown below:

Claim 13, line 9; after "between the ball and" correct "heels" to read --heel--.

Claim 17, line 11; change "200-m Hg." to read --200-mm Hg.--

Claim 20, change line 1 to read:
--The method of claim 17 or claim 18 or claim 19, in--

Claim 21, change line 1 to read:
--The method of claim 17 or claim 19, in which the--

Claim 22, change line 1 to read:
--The method of claim 18, in which the period of step (c)--

Signed and Sealed this

First Day of July, 1997

Bruce Lehman

*Attest:*

BRUCE LEHMAN

*Attesting Officer*

*Commissioner of Patents and Trademarks*

UNITED STATES PATENT AND TRADEMARK OFFICE

CERTIFICATE OF CORRECTION

PATENT NO. : RE 32,940
DATED : December 3, 1996
INVENTOR(S) : Gardner et al.

It is certified that error appears in the above-identified patent and that said Letters Patent is hereby corrected as shown below:

Claim 13,
Line 9, after "between the ball and" correct "heels" to read -- heel --

Claim 17,
Line 11, change "200-m Hg." to read -- 200-mm Hg. --

Claim 20,
Change line 1 to read: -- The method of claim 17 or claim 18 or claim 19, in --

Claim 21,
Change line 1 to read: -- The method of claim 17 or claim 19, in which the --

Claim 22,
Change line 1 to read: -- The method of claim 18, in which the period of step (c) --

Signed and Sealed this

Twenty-sixth Day of February, 2002

*Attest:*

*Attesting Officer*

JAMES E. ROGAN
*Director of the United States Patent and Trademark Office*

UNITED STATES PATENT AND TRADEMARK OFFICE

CERTIFICATE OF CORRECTION

PATENT NO. : RE. 32,940
DATED : December 3, 1996
INVENTOR(S) : Gardner et al.

It is certified that error appears in the above-identified patent and that said Letters Patent is hereby corrected as shown below:

Title page,
Beneath the heading "OTHER PUBLICATIONS", cancel the present 4-paragraph recital and replace with a 3-paragraph recital, as follows:

-- Gaskell and Parrott, "The Effect of a Mechanical Venous Pump on the Circulation of the Feet in the Presence of Arterial Obstruction", Pub. Apr. 1978, Surgery, Gynecology & Obstetrics.

Selahaddin Rastegeldi article in two parts: "I. Pressure Treatment of Peripheral Vascular Diseases, A Short Historical Review" and "II. Intermittent Pressure Treatment of Peripheral Vascular Diseases, A Survey of Sixteen Years Personal Experience", published in OPUSCULA MEDICA, Supplemental XXVII 1972, Grundad av Sixteen Kallner 1956.

Gardner and Fox article, entitled "The Venous Pump of the Human Foot-Preliminary Report", published in the Jul. 1983 issue of BRISTOL MEDICO-CHIRURGICAL JOURNAL, at pp. 109-112.

ABSTRACT, line 5, change "sitmulation" to read -- stimulation --.

Column 2,
Line 10, change "viewed" to read -- Viewed --.

Claim 13,
Line 9, after "between the ball and" correct "heels" to read -- heel --.

Claim 17,
Line 11, change "200-m Hg." to read -- 200-mm Hg. --

Claim 20,
Change line 1 to read, -- The method of claim 17 or claim 18 or claim 19, in --

UNITED STATES PATENT AND TRADEMARK OFFICE

CERTIFICATE OF CORRECTION

PATENT NO. : Re. 32,940
DATED : December 3, 1996
INVENTOR(S) : Gardner et al.

It is certified that error appears in the above-identified patent and that said Letters Patent is hereby corrected as shown below:

Claim 21,
Change line 1 to read , -- The method claim 17 or claim 19 , in which the --

Claim 22,
Change line 1 to read, -- The method of claim 18, in which the period of step (c) --

This certificate supercedes Certificate of Correction issued February 21, 2001.

Signed and Sealed this

Fifth Day of March, 2002

*Attest:*

*Attesting Officer*

JAMES E. ROGAN
*Director of the United States Patent and Trademark Office*

US001032940B1

REEXAMINATION CERTIFICATE (3067th)

United States Patent [19]

Gardner et al.

[11] B1 Re. 32,940

[45] Certificate Issued Dec. 3, 1996

[54] METHOD FOR STIMULATING THE VENOUS-PUMP MECHANISM OF THE FOOT

[75] Inventors: Arthur M. N. Gardner, Ipplepen; Roger H. Fox, Totnes, both of England

[73] Assignee: Novamedix Limited, Andover, United Kingdom

Reexamination Requests:
No. 90/003,487, Jul. 11, 1994
No. 90/003,987, Oct. 4, 1995

Reexamination Certificate for:

| | |
|---|---|
| Patent No.: | **Re. 32,940** |
| Issued: | **Jun. 6, 1989** |
| Appl. No.: | **194,519** |
| Filed: | **May 16, 1988** |

Certificate of Correction issued Mar. 17, 1992.

Related U.S. Patent Documents

Reissue of:

| | |
|---|---|
| [64] Patent No.: | **4,614,179** |
| Issued: | **Sep. 30, 1986** |
| Appl. No.: | **794,443** |
| Filed: | **Nov. 4, 1985** |

Related U.S. Application Data

[63] Continuation of Ser. No. 763,686, Aug. 8, 1985, Pat. No. 4,614,180, which is a continuation-in-part of Ser. No. 621,499, Jun. 18, 1984, abandoned, and a continuation-in-part of Ser. No. 751,150, Jul. 2, 1985, abandoned, which is a division of Ser. No. 621,499, Jun. 18, 1984, abandoned.

[51] Int. Cl.[6] ..... A61H 7/00

[52] U.S. Cl. ..... 601/152; 128/DIG. 20

[58] Field of Search ..... 601/148–152; 128/DIG. 20

[56] References Cited

U.S. PATENT DOCUMENTS 3,171,410 3/1965 Towle, Jr. et al. .
3,908,642 9/1975 Vinmont ..... 128/40
3,910,221 8/1975 Nicholson et al. ..... 601/151

FOREIGN PATENT DOCUMENTS 2141938 1/1985 United Kingdom .

OTHER PUBLICATIONS

Gaskell/Parrott, "The Effect of a Mechanical Veneous Pump on the Circulation of the Feet in the Presence of Arterial Obstructions", Pub. Apr. 1978, Surgery, Gynecology & Obstetr.

Rastgoldi, "Intermittent Pressure Treatment of Peripheral Vascular Diseases, A Survey of Sixteen Years Personal Experience", Pascula Medica, 1972.

Selahaddin Rastgeldi article in two parts: "I. Pressure Treatment of Peripheral Vascular Diseases, A Short Historical Review" and II. Intermittent Pressure Treatment of Peripheral Vascular Diseases, A Survey of Sixteen Years Personal Experience, published in *Opuscula Medica,* Supplemental XXVII 1972, Grundad av Sixten Kallner 1956.

Gaskell and Parrott article, entitled "The Venous Pump of the Foot–Preliminary Report," published in the Jul. 1983 issue of *Bristol Medico–Chirurgical Journal,* at pp. 109–112.

*Primary Examiner*—Robert A. Hafer

[57] ABSTRACT

The invention contemplates a non-invasive technique and apparatus for artificially stimulating the venous-return flow of blood from the foot by inducing sharply pulsed squeezing or necking-down of the vessels of the venous-pump mechanism within the foot. The sitmulation results from transient flattening of the plantar arch, in that an induced transient spread of the heel with respect to the ball of the foot stretches, and therefore necks-down involved blood vessels; stimulation also results from such a squeeze of the plantar-arch region as to concurrently squeeze the involved blood vessels. Cyclically inflatable devices, local to the foot-pump region, are disclosed for inducing either or both of the indicated actions.

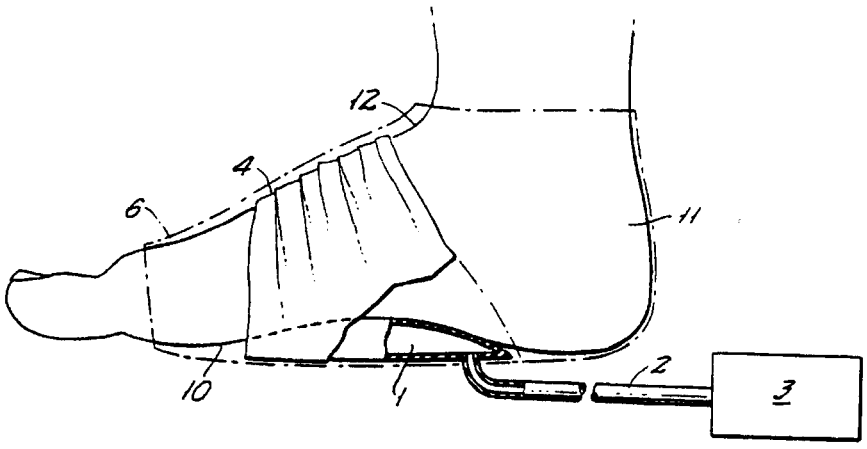

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, lines 50–64:

In use of the appliance when secured to a foot as shown in FIG. 1, the pump apparatus 3 operates rapidly to inflate the bag 1 which [when] *then* applies a pumping pressure to the sole 10 of the foot 11, and also urges the ball and heel of the foot away from each other, thus flattening the plantar arch as would occur if the foot 11 were placed on the ground during normal ambulation, thereby stimulating venous blood-flow. Preferably, an accumulator tank is part of the pump apparatus 3, the same being continuously charged by the pump, and having the capacity for rapid inflation of bag 1. A valve arrangement (not shown) in the pump apparatus 3 then allows the bag 1 to deflate, whereafter the bag 1 is again inflated, the inflation/deflation cycle being repeated as long as treatment with the appliance is required.

Column 4, lines 1–29:

What has been described for bag 1 in connection with FIG. 4 will in and of itself serve well as an article of manufacture, in [the] *that* gauze, muslin, bandage material and/or adhesive tape may be relied upon to retain a circumferentially wrapped application of the bag to the foot. However, to facilitate such application without initial resort to such other instrumentalities, FIG. 4 additionally illustrates present preference for a flexible anchor tab 23 (as of vinyl sheet) which is integrally formed with bag 1, extending laterally beyond seam 22 at the longitudinal edge E of area A, and for a tie-down tab 24, also integrally formed with bag 1 beyond seam 22 at the transverse tip F of area B. A peel-off strip 25 of suitable release material is shown protecting a coating of pressure-sensitive adhesive on tab 24, so that upon adhesive exposure, tab 24 may be "tacked" to tab 23 in adjustably secured retention of the wrapped application of bag 1 to a foot. And it will be noted for the preferred relatively non-stretch nature of the material of tabs 23–24, a "tacked" circumferential completion of the wrap, involving a fastening of tab 24 in outer-end lap with [tap] *tab* 23, will enable circumferential hoop-tension force to be relatively uniformly distributed along substantially the entire longitudinal extent of area A, i.e., along edge E, thus assisting in the plantar-arch flattening action described above. Plural apertures in the larger tab 23 allow ventilation of adjacent skin but do not impair the indicated distribution of hoop-tension force.

Column 4, lines 57–68, and Column 5, lines 1–12:

The described bag of FIG. 4 will be seen, in cyclically pressurized use within the circumferential bandage or sling 4 of FIG. 1, or within the cast 100 of FIGS. 2 and 3, to provide a peripherally continuous confinement of the midtarsal and plantar regions of a foot, with the action of rapidly shrinking the confinement in a [cylindrical] *cyclical* pattern of relatively rapid short-duration release from shrink action.

More specifically, this confinement and cyclical action may be viewed as the means of providing (a) upward and spreading force at longitudinally spaced plantar regions of the sole of the foot, said regions being essentially limited by and between the ball and heel of the foot and (b) downward force at the region of the midtarsal joint. As a result of the indicated cyclical pattern, the arch is caused to flatten periodically and thus to stretch and neck down the internal sectional area of the veins of the lateral plantar complex, with resulting venous-pump action. viewed in a still further light, this confinement and cyclical action will be seen as the means of providing vertically opposed squeezing forces between the plantar region of the sole of the foot and the region of the midtarsal joint, to thereby stimulate the venous-pump mechanism of the foot.

AS A RESULT OF REEXAMINATION, IT HAS BEEN DETERMINED THAT:

The patentability of claims 1, 4–10 and 14 is confirmed.

Claims 2, 3, 11–13 and 16 are determined to be patentable as amended.

Claim 15, dependent on an amended claim, is determined to be patentable.

New claims 17–22 are added and determined to be patentable.

2. The method of promoting venous pump action in the leg of a living body, which method comprises simultaneously applying vertically opposed squeezing forces *substantially only* between the plantar region of the sole of the foot and the region of the midtarsal joint, *the plantar region being essentially limited by and between the ball and heel of the foot,* said forces being applied in a cyclical pattern of relatively rapid increase to a predetermined upper limit before relaxation for a period substantially exceeding the application time, thereby to stimulate the venous pump mechanism of the foot.

3. The method of promoting venous pump action in the leg of a living body, which method comprises establishing a peripherally continuous confinement of *substantially only* the midtarsal and plantar regions of [a] *the* foot, *the plantar region being essentially limited by and between the ball and heel of the foot,* and shrinking the confinement in a cyclical pattern of relatively rapid short-duration shrink action followed by a relatively long-duration release from shrink action.

11. The method of promoting venous pump action in the leg of a living body, which method comprises the steps of (a) applying vertically opposed squeezing forces to the foot *substantially only* at the region of the midtarsal joint and at the plantar region therebeneath, *the plantar region being essentially limited by and between the ball and heel of the foot,* (b) relaxing said forces for a period of time, and (c) cyclically repeating the force-application and the force-relaxation steps in a pattern wherein force-application is relatively rapid, whereby the veins of the plantar complex are periodically compressed, with resulting venous-pump action.

12. The method of promoting venous pump action in the leg of a human body, which method comprises the steps of (a) establishing a peripherally continuous [plantar] *plantar-region* confinement of the foot *substantially only* at the region of the midtarsal joint, *the plantar-region confinement*

*being essentially limited by and between the ball and heel of the foot,* (b) shrinking the confinement, (c) relaxing the shrinking confinement and [(c)] *(d)* cyclically repeating the shrinkage and relaxing steps in a pattern wherein the shrinkage step is relatively rapid, whereby the veins of the plantar complex are periodically compressed, with resulting venous-pump action.

13. The method of promoting venous pump action in the leg of a human body, which comprises the steps of (a) selecting a relatively stiff sole member of length to [overly] *overlie* the ball and heel of the foot and to span the plantar arch, (b) securing the same to the foot with referencing support at the ball and heel, (c) applying upward force *substantially only* between the sole member and the plantar arch, *the upward force application being within the plantar arch between the ball and heels,* (d) relaxing said force for a period of time, and (e) cyclically repeating the force-application and the force-relaxation steps in a pattern wherein force-application is relatively rapid, whereby the internal sectional area of the veins of the plantar complex is periodically reduced, with resulting venous pump action.

16. The method of claim 5 [or claim 11 or claim 12 or claim 13], in which the force application step is pneumatic and to a peak pressure of at least 200-mm Hg.

*17. The method of promoting venous pump action in the leg of a living body, which method comprises the steps of (a) applying vertically opposed squeezing forces to the foot at the region of the midtarsal joint and at the plantar region therebeneath, (b) relaxing said forces for a period of time, and (c) cyclically repeating the force-application and the force-relaxation steps in a pattern wherein force-application is relatively rapid, whereby the veins of the plantar complex are periodically compressed, with resulting venous-pump action, the force application of step (a) being pneumatic and to a peak pressure of at least 200-m Hg.*

*18. The method of promoting venous pump action in the leg of a human body, which method comprises the steps of (a) establishing a peripherally continuous plantar confinement of the foot at the region of the midtarsal joint, (b) shrinking the confinement with an application of pneumatic force which is to a peak pressure of at least 200-mm Hg, (c) relaxing the shrinking confinement, and (d) cyclically repeating the shrinkage and relaxing steps in a pattern wherein the shrinkage step is relatively rapid, whereby the veins of the plantar complex are periodically compressed, with resulting venous-pump action.*

*19. The method of promoting venous pump action in the leg of a human body, which comprises the steps of (a) selecting a relatively stiff sole member of length to overlie the ball and heel of the foot and to span the plantar arch, (b) securing the same to the foot with referencing support at the ball and heel, (c) applying upward force between the sole member and the plantar arch, the force-application being pneumatic and to a peak pressure of at least 200-mm Hg, (d) relaxing said force for a period of time, and (e) cyclically repeating the force-application and the force-relaxation steps in a pattern wherein force-application is relatively rapid, whereby the internal sectional area of the veins of the plantar complex is periodically reduced, with resulting venous-pump action.*

*20. The method of claim 19 or claim 20 or claim 21, in which the force application is developed in one second or less.*

*21. The method of claim 19 or claim 21, in which the period of force-relaxation is in the range of 10 to 60 seconds.*

*22. The method of claim 20, in which the period of step (c) is in the range of 10 to 60 seconds.*

* * * * *

US00RE32940C2

(12) REEXAMINATION CERTIFICATE (4597th)

United States Patent

Gardner et al.

(10) Number: US RE32,940 C2

(45) Certificate Issued: Jun. 11, 2002

(54) METHOD FOR STIMULATING THE VENOUS-PUMP MECHANISM OF THE FOOT

(75) Inventors: Arthur M. N. Gardner, Ipplepen; Roger H. Fox, Totnes, both of (GB)

(73) Assignee: Novamedix Distribution Limited, Nicosia (CY)

Reexamination Request:
No. 90/005,225, Jan. 21, 1999

Reexamination Certificate for:

| | |
|---|---|
| Patent No.: | **Re. 32,940** |
| Issued: | **Jun. 6, 1989** |
| Appl. No.: | **07/194,519** |
| Filed: | **May 16, 1988** |

Reexamination Certificate B1 issued Dec. 3, 1996

Related U.S. Patent Documents

Reissue of:

| | |
|---|---|
| (64) Patent No.: | **6,141,792** |
| Issued: | **Sep. 30, 1986** |
| Appl. No.: | **06/794,443** |
| Filed: | **Nov. 4, 1985** |

Related U.S. Application Data

(63) Continuation of application No. 06/763,686, filed on Aug. 8, 1985, now Pat. No. 4,614,180, which is a continuation-in-part of application No. 06/751,150, filed on Jul. 2, 1985, now abandoned, which is a division of application No. 06/621,499, filed on Jun. 18, 1984, now abandoned, said application No. 06/763,686, is a continuation-in-part of application No. 06/621,499.

(30) Foreign Application Priority Data

| | | |
|---|---|---|
| Jun. 22, 1983 | (GB) | 8316959 |
| Nov. 11, 1983 | (GB) | 8330138 |

(51) Int. Cl.[7] ..... A61H 9/00

(52) U.S. Cl. ..... 601/152; 128/DIG. 20

(56) References Cited

U.S. PATENT DOCUMENTS

| | | | |
|---|---|---|---|
| 3,171,410 | A | 3/1965 | Towle, Jr. et al. |
| 3,908,642 | A | 9/1975 | Vinmont |

FOREIGN PATENT DOCUMENTS

| | | | |
|---|---|---|---|
| FR | 77-14667 | | 5/1977 |
| GB | 2141938 | | 6/1984 |
| JP | 479291 | | 10/1972 |
| JP | 47-10392 | * | 10/1972 |
| JP | 48-20636 | * | 3/1973 |
| JP | 4927091 | | 3/1974 |
| JP | 5486897 | | 6/1979 |

OTHER PUBLICATIONS

Selahaddin Rastgeldi Article in Two Parts: "I. Pressure Treatment of Peripheral Vascular Disease," and "II. Intermittent Pressure Treatment of Peripheral Vascular Disease, A Survey of Sixteen Years Personal Experience," published in Opuscula Medica, Supplemetum XXVII 1972, Grundad av Sixten Kallner 1956.

(List continued on next page.)

*Primary Examiner*—Danton DeMille

(57) ABSTRACT

The invention contemplates a non-invasive technique and apparatus for artificially stimulating the venous-return flow of blood from the foot by inducing sharply pulsed squeezing or necking-down of the vessels of the venous-pump mechanism within the foot. The stimulation results from transient flattening of the plantar arch, in that an induced transient spread of the heel with respect to the ball of the foot stretches, and therefore necks-down involved blood vessels; stimulation also results from such a squeeze of the plantar-arch region as to concurrently squeeze the involved blood vessels. Cyclically inflatable devices, local to the foot-pump region, are disclosed for inducing either or both of the indicated actions.

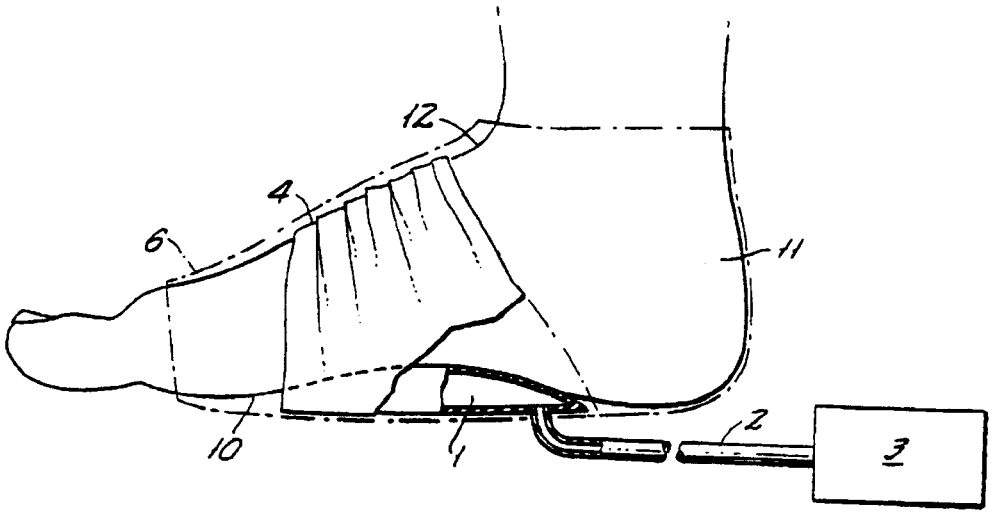

OTHER PUBLICATIONS

Delis, et al., "Enhancing Venous Outflow in the Lower Limb with Intermittent Pneumatic Compression. A Comparative Haemodynamic Analysis on the Effect of Foot vs. Calf vs. Foot and Calf Compression", *European Journal of Vascular and Endovascular Surgery*, Mar. 2000, vol. 19, pp. 250 to 260. (Exhibit 2).

Delis, et al., "The acute effects of intermittent pneumatic foot versus calf versus simultaneous foot and calf compression on popliteal artery hemodynamics: A comparative study", *Journal of Vascular Surgery*, Aug. 2000, vol. 32, No. 2, pp. 284 to 292. (Exhibit 1).

Memorandum Construing Disputed Claim Language, Order, Jan. 12, 2001, *Novamedix Distribution Limited v. Q. Todd Dickinson*, U.S. District Court for the District of Columbia, Civil Action No. 99–1809(JR), U.S. Patent 4,721,101, pp. 1 to 6 (Memorandum), pp. 1 to 2 (Order).

Transcript of Markman Hearing, Oct. 12, 2000, *Novamedix Distribution Limited v. Q. Todd Dickinson*, U.S. District Court for the District of Columbia, Civil Action No. 99–1809(JR), U.S. Patent 4,721,101, Sheets 1 to 45 (transcript), Sheets 1 to 21 (index).

McCarthy, et al., "A New Method Of Preventing the Fatal Embolus, Preliminary Report", *Surgery—A Monthly Journal Devoted to the Art and Science of Surgery*, vol. 25, Jan. to Jun., 1949, The C. V. Mosby Company, 1949, pp. 891 to 896.

* cited by examiner

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–22 is confirmed.

* * * * *